(12) United States Patent
Beutin et al.

(10) Patent No.: US 6,282,881 B1
(45) Date of Patent: Sep. 4, 2001

(54) COOLING SYSTEM FOR A TURBOMACHINE SPEED REDUCER

(75) Inventors: Bruno Albert Beutin, Corbeil Essonnes; Pascal Noël Brossier, St Martin en Biere; Michel François Raymond Franchet, Pouilly le Fort; Jean-Loïc Hervé Lecordix, Vaux le Penil; Marc Georges Loubet, Boissise la Bertrand, all of (FR)

(73) Assignee: Societe Nationale d'Etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/476,083

(22) Filed: Jan. 3, 2000

(30) Foreign Application Priority Data

Jan. 7, 1999 (FR) .................................................. 99 00082

(51) Int. Cl.[7] ........................................................ F02C 7/14
(52) U.S. Cl. ..................... 60/39.08; 60/39.07; 60/226.3; 60/226.1; 184/6.11
(58) Field of Search ............................... 60/39.08, 39.07, 60/226.1, 226.3, 264; 184/6.11

(56) References Cited

U.S. PATENT DOCUMENTS

| | | |
|---|---|---|
| 4,351,150 | 9/1982 | Schulze . |
| 4,409,788 * | 10/1983 | Nash .................... 60/226.3 |
| 4,765,131 * | 8/1988 | Benson .................. 60/39.07 |
| 4,999,994 * | 3/1991 | Rud et al. ............... 60/39.08 |
| 5,265,408 | 11/1993 | Sheoran et al. . |
| 5,438,823 * | 8/1995 | Loxley et al. ............ 60/39.08 |
| 5,553,449 * | 9/1996 | Rodgers et al. .......... 60/39.08 |
| 5,806,793 | 9/1998 | Brossier et al. . |
| 5,987,877 * | 12/1999 | Steiner ................... 60/39.08 |
| 6,000,210 * | 12/1999 | Negulescu ............... 60/39.08 |
| 6,058,696 * | 5/2000 | Nikkanen et al. ........ 60/226.1 |
| 6,092,360 * | 7/2000 | Hoag et al. .............. 60/39.08 |

FOREIGN PATENT DOCUMENTS

| | | |
|---|---|---|
| 195 24 731 | 1/1997 | (DE) . |
| 0 514 119 | 11/1992 | (EP) . |
| 0 743 247 | 11/1996 | (EP) . |
| 2 742 479 | 6/1997 | (FR) . |
| WO 92/11451 | 7/1992 | (WO) . |

* cited by examiner

Primary Examiner—Ted Kim
(74) Attorney, Agent, or Firm—Oblon, Spivak, McClelland, Maier & Neustadt, P.C.

(57) ABSTRACT

A system for cooling the lubricant of the speed reducer of an aircraft turboshaft-engine during high-speed flight and during low-speed taxying. The cooling system includes a radiator through which the lubricant flows. An air supply duct delivers cooling air over the radiator. An air discharge duct discharges the air into the exhaust nozzle of the engine. The air supply duct is fed by an arcuate air take-off slot disposed in the air intake of the engine. The air discharge duct is provided with a flap for slowing air flow through the cooling system, and with an ejector-mixer, which is fed by compressed air, taken from the engine compressor, for creating a Venturi effect to increase air flow through the cooling system when required.

3 Claims, 3 Drawing Sheets

COOLING SYSTEM FOR A TURBOMACHINE SPEED REDUCER

CROSS-REFERENCE TO RELATED APPLICATIONS

This application is related and claims priority, under 35 U.S.C. §119, to French Patent Application No. 99-00082 filed on Jan. 7, 1999, the entire contents of which is hereby incorporated by reference herein.

BACKGROUND OF THE INVENTION

1. Field of the Invention

The present invention relates to turbomachines having a speed reducer and more particularly, to turboprop engines and high-power bypass turbojet engines, such as are used in civil aviation.

2. Discussion of Background

To improve performance while reducing noise and fuel consumption, turbomachines such as turboprop engines must have slow-running large-diameter multiple blade propellers. However, the power transmitted to a slow-running propeller from a fast-running gas turbine through a mechanical speed reducer produces considerable heat as a result of mechanical losses—i.e., due to friction. Of course, this heat must be dissipated or removed efficiently, otherwise the mechanical parts of the reducer, such as the gears and bearings, will soon be damaged or the qualities of the reducer lubricant will be impaired, leading to decreased engine efficiency. Even with an efficiency of close to or even exceeding 99%, the speed reducer of a turbomachine with a mechanical power equivalent to 10,000 kW, evolves a heat equivalent of 100 kW due to mechanical losses.

It is well known in the art to remove this kind of heat—i.e., to dissipate this kind of thermal power —by means of a closed-circuit pump or thermosyphonic circulation of the reducer lubricant through a radiator, such as an oil radiator or an oil-air exchanger.

FIG. 1 shows a schematic view of one possible example of this known form of cooling. In FIG. 1 the propeller 1 of a turboprop engine is driven by a gas generator 2 through a speed reducer 3. The speed reducer 3 is cooled by circulation of its lubricant through a cooling circuit 4 including a radiator 6 disposed in the bottom scoop 5 of the engine. The radiator 6 may also be disposed below the aircraft wing 20 or even laterally with respect to the aircraft wing 20.

In the example shown in FIG. 1, the air moving through the radiator 6 removes the heat to outside the bottom scoop 5, and the cooled lubricant returns to the speed reducer 3 through the cooling circuit 4. If required, a flap (not shown) can be provided at the entry or exit of the scoop 5 to control the rate of air flow through the radiator 6 in order to stabilize the temperature of the lubricant, since at high speed the radiator 6 is oversized, as compared with low speeds. This kind of radiator 6, particularly if it is an air-oil heat exchanger, must be large if it is to remove substantial amounts of heat. This is the case, inter alia, during low speed flight, during prolonged parking with the engine idling, and also during runway taxying. This kind of equipment is therefore heavy and bulky, increases engine drag, requires a large quantity of oil, and is very vulnerable to the intake of birds.

However, this latter disadvantage does not occur with a cooling system such as that described in French patent application No. FR-A-2 742,479 (hereinafter "FR'479"). In FR '479, the boundary layer of the air flow over the engine nacelle, particularly in the zone where this boundary flow becomes turbulent as aircraft speed increases, is aspirated via holes in the cowling so that air is drawn into a collector in which a long heat exchanger, which forms a part of the cooling system, is disposed. However, since the rate of air flow through the holes is low this cooling system needs a very long, and therefore very bulky, heat exchanger.

SUMMARY OF THE INVENTION

It is an object of the present invention to overcome the disadvantages of the prior art cooling systems, particularly as above-described.

Since an aircraft spends more of its time at medium or high speeds than at low speeds or idling, it would appear more appropriate to dimension the air-oil radiator for the longest flight phases and, during the shorter phases, to increase temporarily the air flow through the radiator in some appropriate fashion, rather than to reduce the air flow through an oversize radiator by means of flaps.

Accordingly, the present invention provides a turbomachine including: at least one air intake scoop; an internal gas flow path; an exhaust nozzle; a speed reducer, which is arranged to be lubricated by a lubricant; and a cooling system for the lubricant. The cooling system includes: a lubricant circuit for the flow of lubricant to and from the speed reducer; a radiator, in the lubricant circuit, for dissipating heat from the lubricant as it flows through the radiator; an air supply duct leading to the radiator; and at least one air take-off slot, of very reduced cross-section, disposed in the air intake scoop of the turbomachine, wherein the air take-off slot communicates with and feeds air to the air supply duct.

Preferably, the cooling system also includes an air discharge duct leading from the radiator and opening into the exhaust nozzle of the turbomachine.

In order to vary the rate of air flow through the radiator, it is also preferable to provide a pivotally mounted flap in the air discharge duct.

To ensure an adequate rate of air flow through the radiator when the air flow into the turbomachine is low and to enable a radiator of reduced size to be used, if the turbomachine has at least one compressor, the cooling system, according to the present invention, preferably also includes a compressed air take-off duct, connected to the compressor, and opening into the air discharge duct through an ejector-mixer in order to accelerate the air flow through the cooling system; and a control valve for controlling said compressed air take-off duct and controlled by a control unit of the turbomachine.

DETAILED DESCRIPTION OF THE PREFERRED EMBODIMENTS

Figure 2:
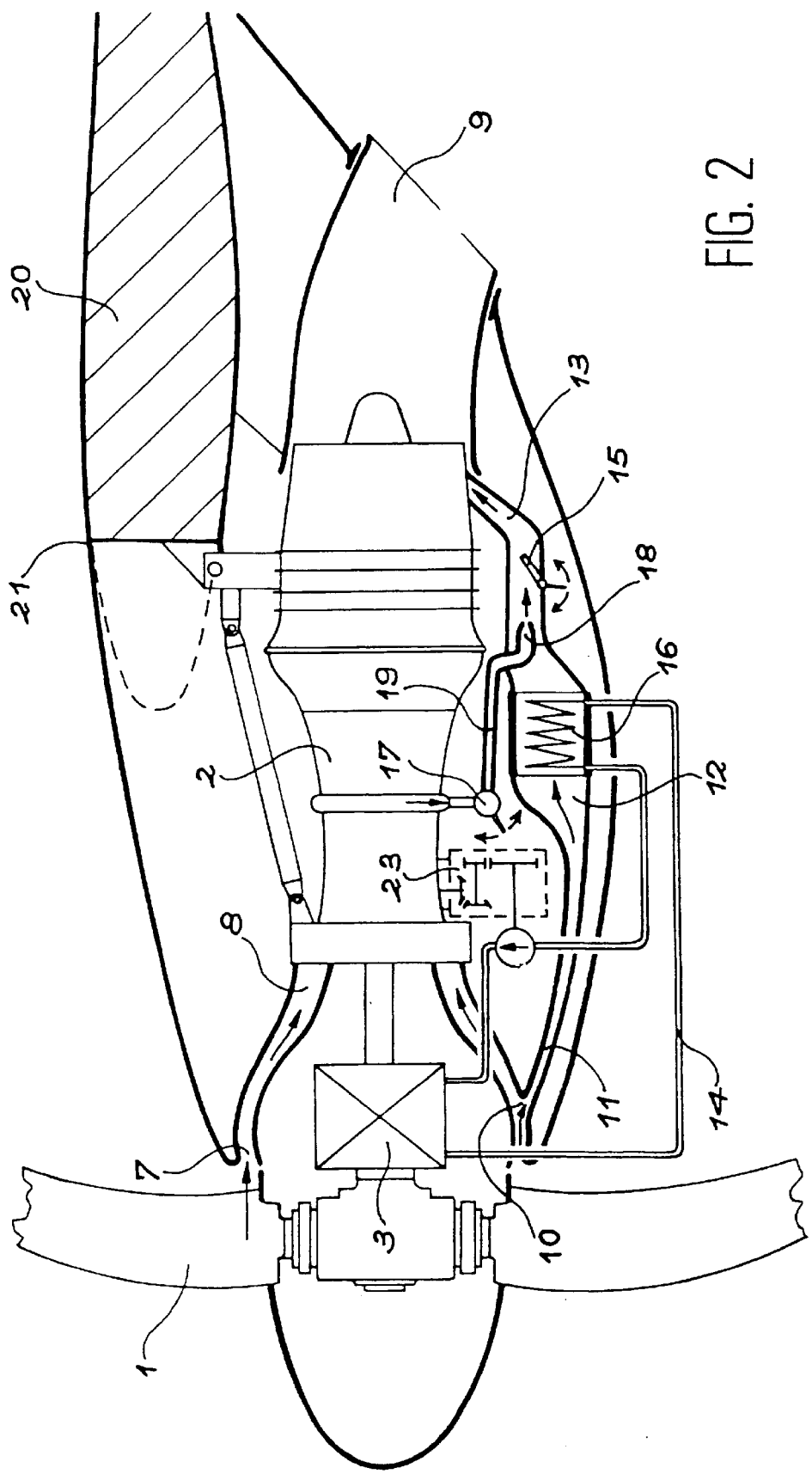
FIG. 2 is a schematic, partial cross-sectional view of a turboprop engine fitted with a speed reducer cooling system in accordance with the present invention.

FIG. 2 shows the main elements of a turboshaft engine installed below an aircraft wing 20. In this case, the engine is a turboprop engine. A propeller 1 is disposed at the upstream end of the engine and is rotated by a turbine 2 through a speed reducer 3. The engine is supplied with air by an internal air flow path 8 which enters through an air intake scoop 7 disposed immediately behind the propeller 1 at the front of the engine cowl 21.

In order not to reduce engine efficiency, radiator cooling air is taken off immediately downstream of the air intake scoop 7. Thus, at least one air take-off slot 10 is disposed in the internal air flow path 8 of the engine downstream of the air intake scoop 7 for supplying air to an air feed duct 11. The air feed duct 11 serves to deliver air to a radiator 16 through which the speed reducer lubricant flows and which is mounted in a central part 12 of the cooling system—i.e., downstream of the air feed duct 11, which widens at the central part 12.

The air take-off slot 10 is therefore in the shape of a segment or arc of a circle corresponding to the curvature of the air intake scoop 7.

The cooling system is completed by an air discharge duct 13, disposed downstream of the central part 12, to extend the air flow through the radiator 16 and discharge the air towards the exhaust nozzle 9 of the engine.

As will be apparent, at high speed on a long flight or in very cold weather, the air, entering the air take-off slot 10 and flowing through the air feed duct 11 to the radiator and discharging through the air discharge duct 13 towards the exhaust nozzle 9, can provide satisfactory cooling of the radiator 16 and of the lubricant, namely oil, flowing through the radiator 16. A flap 15 for varying the rate of the air flow through the cooling system is provided downstream of the radiator 16 in the air discharge duct 13. The flap 15 is pivotally mounted so as to be able to form an obstacle to the air flow and reduce the effectiveness of the flow of air in the cooling system. Advantageously, a flap 15 of this kind can be controlled by the automatic system controlling engine operation, which is preferably of the "full redundant authority" or FADEC (Full Authority Digital Engine Control) type, and is actuated by known electrical or electromechanical or hydraulic or electrohydraulic means, such as an actuator 24. In this kind of installation, a temperature probe (not shown) can be used to maintain the oil at the required temperature and prevent it from coagulating.

At low speed or during relatively short stationary periods, such as waiting while parking or at fixed points, making slow ground movements and taxying at high outside temperatures in little, if any, relative wind, it is useful to accelerate the air flow rate through the cooling system. To this end, downstream of the radiator 16, the discharge duct 13 is fitted with an outlet for compressed air bled from the engine, preferably at the compressor outlet, through an air bleed or a take-off duct 19. A control valve 17 is placed in the air bleed or take-off duct 19 and is also controlled by the central FADEC control system. The outlet of the air bleed or take-off duct 19 into the air discharge duct 13 is a lobe type ejector-mixer 18.

The ejection of the compressed air through the lobe-type ejector-mixer 18 accelerates the air flow from the air feed duct 11 by an aspiration phenomenon (a Venturi effect due to the downstream cross-sectional narrowing of the central part 12) and increases the cooling air flow through the radiator 16.

The lubricant flow in the lubricant circuit 14 and radiator 16 is produced either by a pump driven by an accessory unit 23 or by a thermosyphon.

Figure 3:
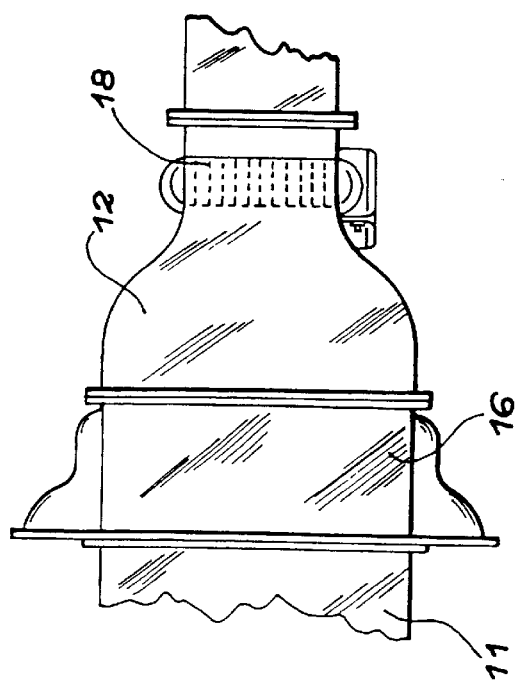
FIG. 3 is a partial top plan view of a part of a cooling system in accordance with the present invention.

FIG. 3 shows the central part 12, of the cooling system, in which the radiator 16 is installed. Disposed downstream of the cental part 12 and the radiator 16, is the lobe type ejector-mixer 18 which is seen to be relatively wide. In fact, the cross-sections of the central part 12, the air feed duct 11, and the air discharge duct 13 are relatively flat.

Figure 5:
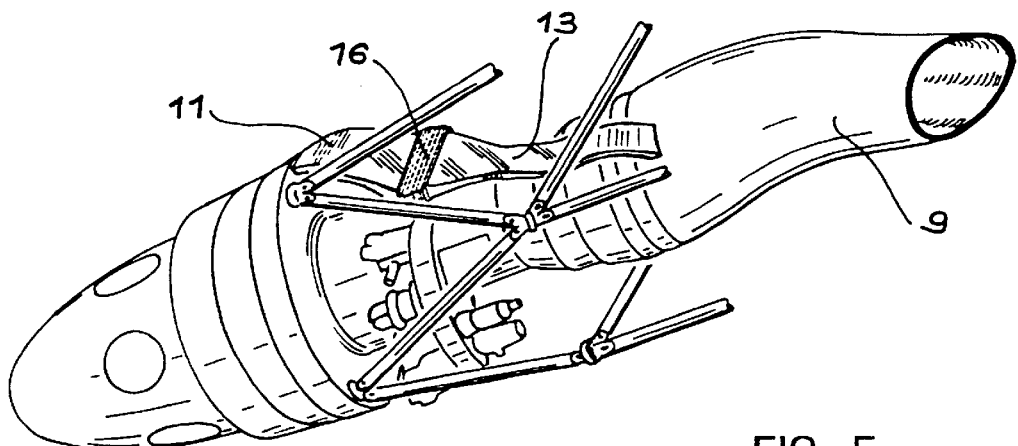
FIG. 5 is a perspective view of the cooling system of the present invention as installed on a turbomachine.
Figure 4:
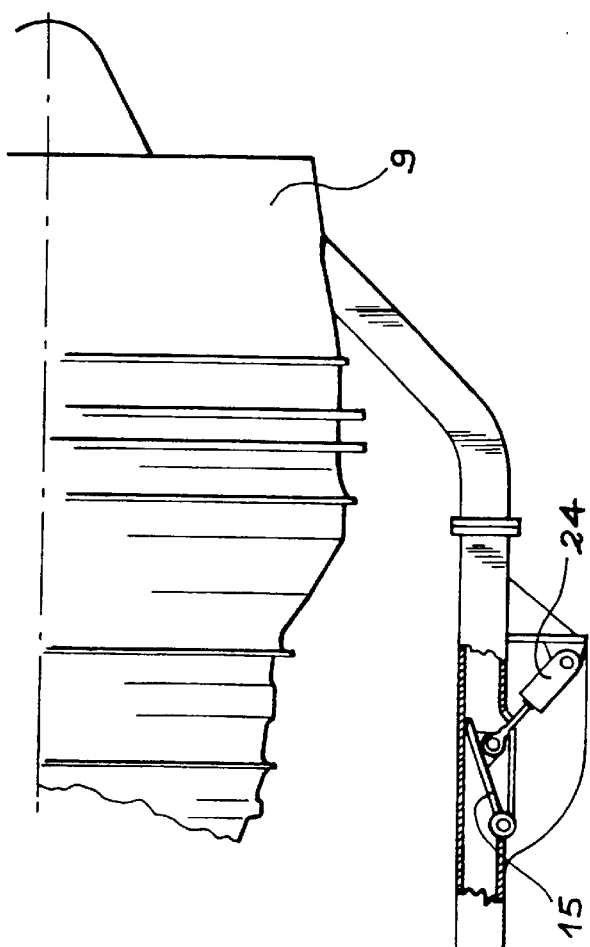
FIG. 4 is a partial side elevational view of a larger part of the cooling system shown in FIG. 3.

FIG. 4 shows these elements in a view perpendicular to that of FIG. 3. This flat form of the radiator 16 and the air flow assembly in the cooling system means that size is no barrier to installing the cooling system on the engine. On the contrary, as shown in FIG. 5, its flatness enables the cooling system to be housed within the engine cowl 21 around the main elements of the engine. FIG. 4 shows only the radiator 16 with the air feed duct 11 and the air discharge duct 13 opening into the exhaust nozzle 9.

FIG. 4 also shows an embodiment of a valve 15 in the air discharge duct 13. The valve 15 can close the air discharge duct 13 to varying extents. Also visible, in FIG. 4, is the junction of the air bleed or take-off duct 19, which has been compressed, the valve 17, and the lobe-type ejector-mixer 18. The air discharge duct 13 opens into the exhaust nozzle 9 and so does not increase the drag of the turboengine assembly.

The flatness of the cross-sections of the various ducts of the cooling system in accordance with the present invention matches the narrowness of the air take-off slot 10 in the internal air flow path 8 of the engine.

The cooling system in accordance with the present invention operates in the following way.

At high speed or in very cold conditions, the air, taken in through the air take-off slot 10 and flowing through the cooling system, is enough to provide the required cooling of the lubricant flowing through the radiator 16. If required, the flap 15 may be partly closed in the air discharge duet 13. Therefore, the lubricant can be maintained at a required temperature.

During waiting periods, at low speeds or at high temperatures, the air flow rate, through the radiator 16, is often inadequate. Therefore, the rate of cooling air flow is increased by means of the lobe-type ejector-mixer 18 under the control of a valve 17. This control is effected in dependence upon the regime or power of the engine, upon the temperature of the reducer lubricant, or upon other reducer-associated parameters, such as torque, regime, or outside temperature. Preferably, the valve 17 keeps the lobe-type ejector-mixer 18 closed during starting and warming up of the lubricant and during take-off.

Advantages of the present invention will now be discussed. The air take-off slot 10, being arcuate, has a very narrow cross-section as compared with the cross-section of the air intake scoop 7, thus solving the problem of ingestion of bulky foreign bodies likely to seriously damage the radiator 16.

Figure 1:
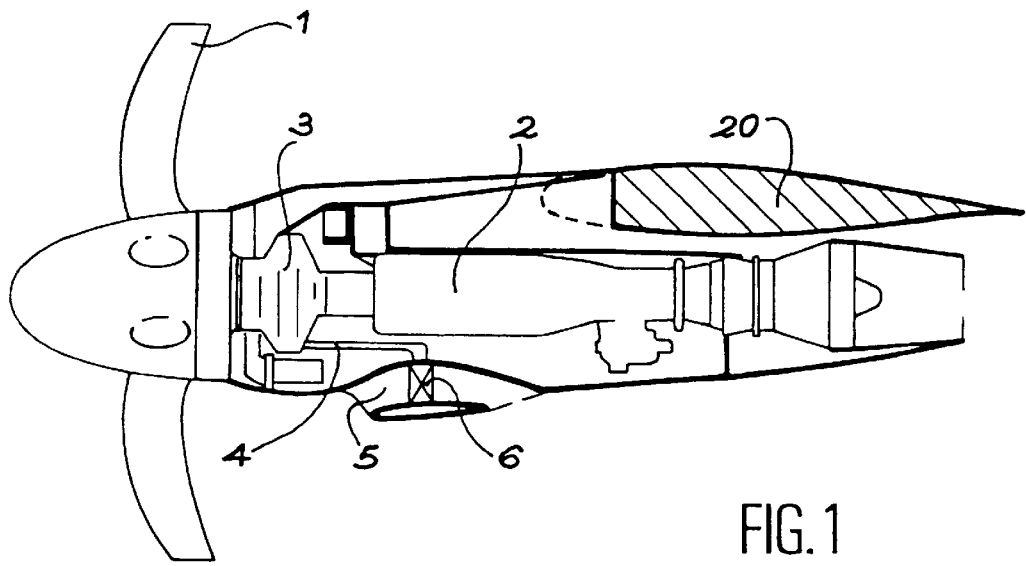
FIG. 1 is a schematic, partial cross-sectional view of an aircraft turboprop engine having a known form of a speed reducer cooling system.

Also, this narrowness of the air take-off slot 10 helps to greatly reduce nacelle drag thanks to the absence of a conventional scoop, such as the bottom scoop 5 of FIG. 1. In addition, the narrow air take-off slot 10, which can be positioned behind a particle trap, does not increase the front infrared signature of the engine assembly.

The radiator 16 of the cooling system is of a relatively small size since it is dimensioned for the flight phases which are the most representative of the aircraft's operation, thus saving on weight and oil.

In other preferred phases of the engine, any deficiency of the radiator 16 is offset by the addition of compressed air via the lobe-type ejector-mixer 18, which accelerates the rate of cooling air flow by the Venturi effect. The lobe-type ejector-mixer 18 can be supplied by a number of ducts which bleed from the turboengine compressor.

By aspiration, the ejection velocity of the exhaust gases, in the exhaust nozzle 9 of the tubine 2, accelerates the discharge of the air flowing through the cooling system in accordance with the present invention and thus, increases the efficiency thereof. Using compressed air, during idling or on the ground, ensures effective cooling of the lubricant in the speed reducer 3.

Also, the exhaust infrared signature of the engine is reduced by the injection of cooler air into the exhaust nozzle 9 and by the absence of any nacelle hot spot.

Coagulation of the lubricant, flowing through the radiator 16, can readily be avoided and controlled by varying the air flow through the radiator 16 by means of the controlled flap 15.

What is claimed is:

1. In a turbomachine including at least one air intake scoop, an internal gas flow path, an exhaust nozzle, a speed reducer which is arranged to be lubricated by a lubricant, and a cooling system for said lubricant, said cooling system comprising:

a lubricant circuit for flow of lubricant to and from said speed reducer;

a radiator located in said lubricant circuit and configured to dissipate heat from said lubricant as said lubricant flows through said radiator;

an air supply duct leading to said radiator;

at least one air take-off slot having a very reduced cross-section, as compared with a cross-section of said at least one air intake scoop, and being disposed in said at least one air intake scoop of the turbomachine, said at least one air take-off slot communicating with and feeding air to said air supply duct;

a compressed air take-off duct connected to a compressor in said internal gas flow path of the turbomachine and opening into an air discharge duct through a lobe type ejector-mixer in order to accelerate an air flow through said cooling system; and a control valve configured to control said compressed air take-off duct and controlled by a control unit of the turbomachine.

2. The cooling system according to claim 1, wherein said radiator is relatively small in size and said air discharge duct leads from said radiator and opens into said exhaust nozzle of the turbomachine.

3. The cooling system according to claim 2, further comprising a flap pivotally mounted in said air discharge duct for controlling an air flow through said radiator and slowing the air flow through said cooling system.

* * * * *